United States Patent
Eichhorn

(10) Patent No.: US 6,194,055 B1
(45) Date of Patent: *Feb. 27, 2001

(54) SHEET OF GLASS WITH COLORED BAND AND GROOVE PATTERN TO SIMULATE A MULTIPANE STRUCTURE

(76) Inventor: Keith L. Eichhorn, 610 Emerywood Dr., High Point, NC (US) 27262

( * ) Notice: Subject to any disclaimer, the term of this patent is extended or adjusted under 35 U.S.C. 154(b) by 0 days.

This patent is subject to a terminal disclaimer.

(21) Appl. No.: 09/130,025

(22) Filed: Aug. 6, 1998

Related U.S. Application Data

(63) Continuation-in-part of application No. 08/629,583, filed on Apr. 9, 1996, now Pat. No. 5,843,546.

(51) Int. Cl.$^7$ .................. B32B 3/28; E06B 3/24
(52) U.S. Cl. .............. 428/167; 428/34; 428/38; 428/207; 428/210; 52/311.1; 52/786.1
(58) Field of Search ................ 428/34, 13, 120, 428/141, 194, 192, 542.2, 38, 167, 206, 207, 210; 52/786.1, 311.1

(56) References Cited

U.S. PATENT DOCUMENTS

| | | | |
|---|---|---|---|
| D. 184,141 | 12/1958 | Mook | D33/9 |
| D. 276,188 | 10/1984 | Metzner | D28/25 |
| D. 285,505 | 9/1986 | Billiet | D6/300 |
| D. 288,746 | 3/1987 | Allekotte | D6/300 |
| 773,306 | 10/1904 | Wadsworth . | |
| 1,785,401 | 12/1930 | Zuckerberg . | |
| 1,929,893 | 10/1933 | Kinney | 51/92 |
| 2,071,411 | 2/1937 | Lamesch | 73/54 |
| 2,294,940 | 9/1942 | Skolnik | 88/105 |
| 3,346,410 | 10/1967 | McCarthy | 117/8 |
| 3,612,030 | 10/1971 | Blum | 125/1 |
| 3,678,628 | 7/1972 | McMaster | 51/5 |
| 3,839,113 | 10/1974 | Yoshida et al. | 156/24 |
| 4,011,692 | 3/1977 | Bos et al. | 51/323 |
| 4,029,531 | 6/1977 | Marinelli | 156/647 |
| 4,046,619 | 9/1977 | Rice et al. | 156/645 |
| 4,129,671 | 12/1978 | Greenberg | 428/48 |
| 4,138,515 | 2/1979 | Dial | 428/30 |
| 4,154,880 | * 5/1979 | Drennan | 428/38 |
| 4,268,347 | 5/1981 | Stephens | 156/628 |
| 4,335,170 | * 6/1982 | Butler | 428/38 |
| 4,495,739 | 1/1985 | Drennan . | |
| 4,813,990 | 3/1989 | Thorn | 65/105 |
| 4,814,213 | 3/1989 | Thorn | 428/34 |
| 4,975,307 | 12/1990 | Sollogoub . | |
| 5,494,715 | * 2/1996 | Glover | 428/34 |
| 5,571,599 | 11/1996 | Eichhorn et al. . | |
| 5,843,546 | * 12/1998 | Eichhorn | 428/38 |

FOREIGN PATENT DOCUMENTS

| | | |
|---|---|---|
| 0 380 832 | 8/1990 | (EP) . |
| WO 88/02298 | 4/1988 | (WO) . |

OTHER PUBLICATIONS

Photocopies of Kinkead Division E6977 drawing (4 pages); date stamped Sep. 29, 1989.
Photocopy of catalog sheets (7 pages)—Universal Art Glass Catalogue No. 310: Art & Beveled Glass; Shattock & McKay Company, Chicago; Feb., 1910.

* cited by examiner

*Primary Examiner*—Donald Loney
(74) *Attorney, Agent, or Firm*—Rhodes & Mason, P.L.L.C.

(57) ABSTRACT

The present invention relates to a continuous transparent glass sheet having the appearance of a multi-pane structure. The glass sheet includes a glass panel having opposed surfaces first and second colored bands formed on at least one of the surfaces and intersecting one another. A plurality of parallel, immediately adjacent straight walled grooves is positioned on opposed sides of the colored band, the straight walled grooves positioned parallel to the colored band. Two of the straight walled grooves are positioned immediately adjacent the colored band. A remaining portion of the surface is not covered by the colored bands, such that the colored bands contrasts with the remaining portion of the surface to simulate the appearance of a plurality of muntins in the glass panel that divide the glass panel into a number of individual panes.

17 Claims, 7 Drawing Sheets

SHEET OF GLASS WITH COLORED BAND AND GROOVE PATTERN TO SIMULATE A MULTIPANE STRUCTURE

RELATED APPLICATIONS

This application is a continuation-in-part under 37 C.F.R. § 1.53(b) of previously filed application Ser. No. 08/629,583 filed Apr. 9, 1996 now U.S. Pat. No. 5,843,546.

FIELD OF THE INVENTION

The present invention is directed to decorative glass, and more specifically to annealed or tempered glass sheets of the type described in which a colored band and, alternatively, one or more parallel, adjacent grooves are formed on at least one surface thereof to simulate the look of a multi-pane structure.

BACKGROUND OF THE INVENTION

In recent years the interior and exterior design of buildings and structures, as well as the furnishings therefor, have employed increasing quantities of decorative glass. For example, it is now commonplace for glass sheets to be used in various types of doors such as shower doors, storm doors, patio doors, entry doors, bi-fold doors, and in decorative windows, mirrors, and other furniture and architectural applications. As the scope of architectural and design tastes expand, the industry has become receptive to glass sheet products which have unique visual effects.

One such visual effect is achieved by the use of a ground groove in the surface of such glass products. The groove is formed by grinding into the surface of an annealed glass sheeting, however, the glass sheets may subsequently be bent, or curved, or further processed (such as by tempering). A unique and attractive method for achieving a remarkable visual effect is disclosed in U.S. Pat. No. 5,409,416 to Eichhorn et al. In that patent is described a decorative glass sheet having a plurality of immediately adjacent parallel grooves and a method for forming the same. Such grooves have steeper walls, thereby achieving more extreme refraction and/or reflection results, more distortion, and therefore a more striking visual difference between the ribbed or grooved section and the other surface of the glass sheet.

Another related use for glass sheets is in insulated glass units (commonly referred to as "IGUs") as used in windows or patio doors for residential and commercial buildings. IGUs typically include a frame in which two sheets of glass or plexiglass are mounted in a parallel arrangement, supported by the frame which engages their respective peripheral edges. The panes define a gap therebetween and, in combination with the frame which spans the gap about the edges, form an enclosed airspace therein. The airspace serves as an insulator.

One problem experienced with conventional IGUs involves the simulation of traditional paned windows. Traditional paned window generally consist of a plurality of panes separated by a grid of muntins. It is known to provide a grid of aluminum or like material secured to the inner surface (i.e., facing the gap) or outer surface of the inside glass panel (i.e., the panel adjacent the interior of the dwelling). These grids, being formed from materials having greater heat transfer properties than the air or vacuum in the airspace, compromise the insulating efficiency of the IGU. Additional disadvantages of these types of grid include their tendency to become loose during shipment resulting in unsatisfactory rattles upon installation. Additionally, the grids can be difficult to install correctly and, as a result, often become crooked during use.

Thus, there exists a need for a decorative glass sheet having a unique decorative visual effect. There exists a need for such a glass sheet which may be incorporated into insulated glass units and like applications while avoiding the installation and appearance problems described above. There exists a need for such a glass sheet which serves to simulate the muntins of a traditional pane glass window. There exists a need for a glass sheet of this type which does not unduly compromise the insulating ability of the insulated glass unit. There exists a need for such a glass panel which may be cost effectively manufactured. Moreover, there exists a need for a technique and tool for forming such a decorative glass sheet.

SUMMARY OF THE INVENTION

The present invention is directed to a continuous transparent glass sheet including a glass panel having opposed surfaces. At least one colored band is formed in at least one of the surfaces. A remaining portion of the surface not covered by the colored band contrasts with the colored to the simulate a muntin that divides the glass panel into at least two individual panes.

The glass sheet may further include at least one straight walled groove disposed parallel to and immediately adjacent the roughed band to enhance the simulated muntin effect. Alternatively at least one such straight walled groove may be provided on opposed sides of the colored band, with each of the grooves positioned parallel to the colored band and two of the straight walled grooves disposed immediately adjacent the colored band. Moreover, the glass sheet may include a plurality of parallel, immediately adjacent straight walled grooves positioned parallel to the colored band, at least one of the straight walled grooves positioned immediately adjacent the colored band. In a preferred embodiment, a plurality of parallel, immediately adjacent straight walled grooves are positioned on opposed sides of the colored band, the straight walled grooves positioned parallel to the colored band and two of the straight walled grooves positioned immediately adjacent the colored band.

A second decorative band may be formed on the surface and intersecting the first decorative band. Preferably, the colored band is from about 4 to 25 mm wide.

The present invention also relates to a continuous transparent glass sheet having the appearance of a multi-pane structure including a glass panel having opposed surfaces and first and second colored bands formed on at least one of the surfaces and intersecting one another. This embodiment further includes a plurality of parallel, immediately adjacent straight walled grooves positioned on opposed sides of the colored band, the straight walled grooves positioned parallel to the colored band and two of the straight walled grooves positioned immediately adjacent the colored band. The remaining portion of the surface not covered by the colored bands contrasts with the colored bands to simulate the appearance of a plurality of muntins in the glass panel dividing the glass panel into a plurality of individual panes.

In an alternative embodiment the present invention relates to a simulated multi-pane window glass sheet, including a continuous glass panel having opposed surfaces and at least one colored band formed on at least one of the surfaces the colored band having the appearance of a multi-pane window muntin. The remaining portion of the surface not covered by the colored band contrasts with the colored band to simulate the appearance of multi-pane window having at least two individual panes.

The present invention is further directed to an insulated glass unit. The insulated glass unit includes a frame and a pair of opposed glass panels mounted in the frame and defining a gap therebetween. At least one of the glass panels is a simulated muntin glass sheet as described above. Preferably, the colored band or bands of this glass sheet are formed in the surface thereof facing the gap.

An object of the present invention is to provide a continuous glass sheet that simulates the appearance of a plurality of individual panes joined by muntins.

An object of the present invention is to provide an insulated glass sheet having a simulated muntin feature as described above which may be incorporated in insulated glass units. Further, it is an object of the present invention to provide such a glass sheet wherein the simulated muntin feature does not unduly compromise the insulating efficiency of the insulated glass unit.

A further object of the present invention is to provide an insulated glass unit incorporating a glass sheet as described.

Another object of the present invention is to provide a simulated muntin glass sheet as described above which may be cost effectively manufactured.

Yet another object of the present invention is to provide a technique for forming the glass sheet of the present invention.

Other objects and a fuller understanding of the present invention will become apparent upon reading the following detailed description of the preferred embodiment along with the accompanying drawings.

DETAILED DESCRIPTION OF THE PREFERRED EMBODIMENT

Figure 1:
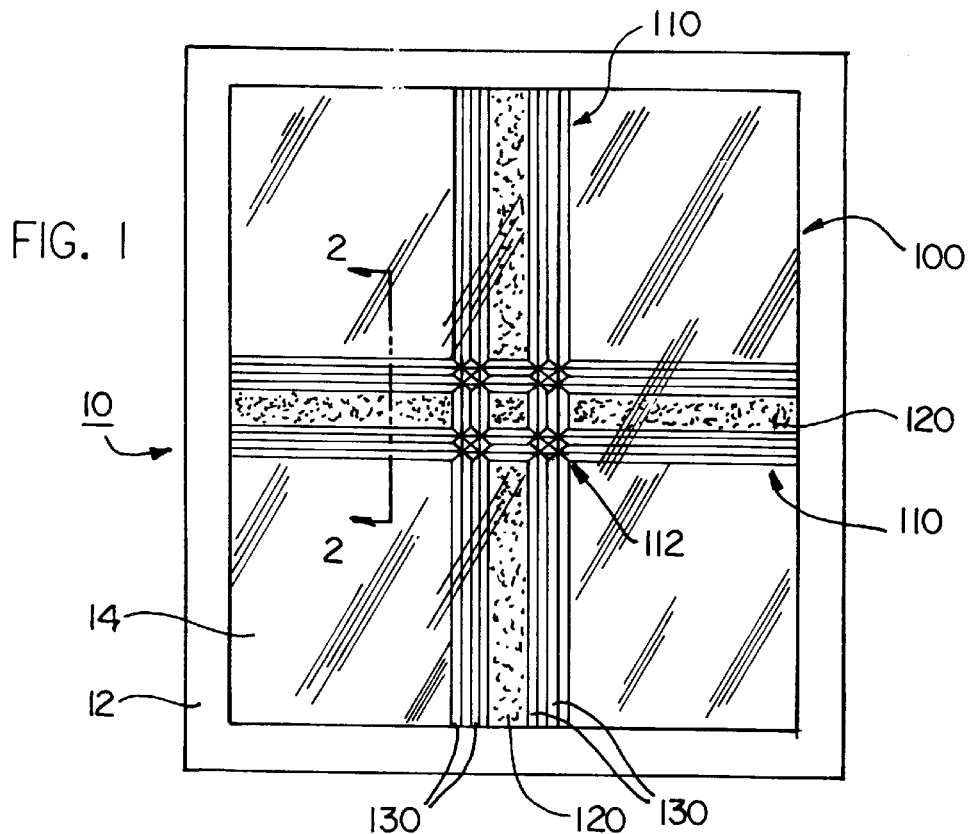
FIG. 1 is a front, elevational view of an insulated glass unit incorporating a decorative glass sheet according to the present invention.
Figure 3:
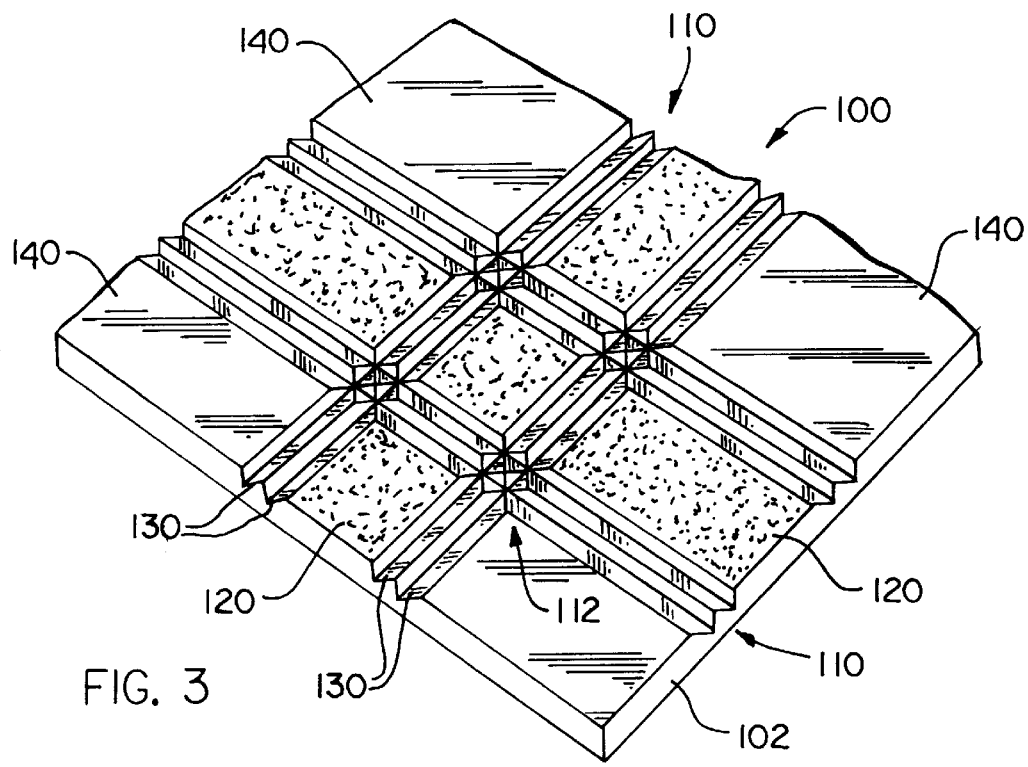
FIG. 3 is a perspective view of a portion of a sheet of glass grooved and abraded in accordance with the present invention.
Figure 2:
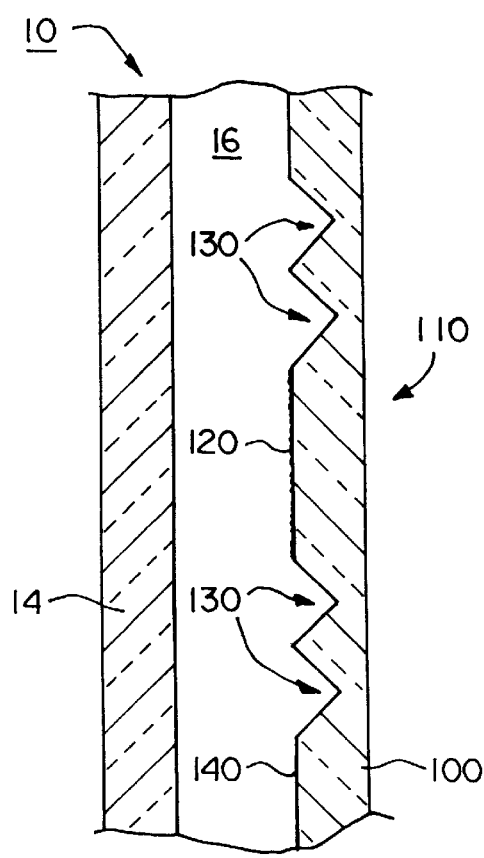
FIG. 2 is a fragmentary, side elevational view of the insulated glass unit as shown along the line 2—2 of FIG. 1.

With reference to FIGS. 1–3, there is shown therein an insulated glass unit 10 incorporating a decorative glass sheet 100 according to the present invention. Insulated glass unit 10 further includes outer, transparent glass sheet 14 and frame 12. Frame 12 supports glass panels 100 and 14 in spaced relation by engaging their respective peripheral edges (e.g., peripheral edges 102 of glass sheet 100 as seen in FIG. 3). More particularly, glass panels 14 and 100 are spaced so as to define a gap 16 therebetween. The construction of insulated glass unit 10, except as discussed below, is otherwise conventional and will be appreciated by those of ordinary skill in the art.

Decorative glass sheet 100 has formed in its surface adjacent gap 16 a pair of decorative bands 110. Decorative bands 110 form intersection 112. Each decorative band 110 includes a raised, roughed band 120 and a pair of grooves 130 on either side thereof. Grooves 130 extend immediately adjacent and parallel to one another and to roughed band 120. The peaks and valleys of grooves 130 may be rounded to form ribs or flutes (i.e., grooves with rounded bottoms). Thus, the word "grooves" should be understood to include flutes. Raised surfaces 140 are defined between peripheral edges 102 and decorative bands 110. Raised surfaces 140 may be untreated and thus transparent, or, if desired, coated, etched, or otherwise treated.

Roughed, raised bands 120 each have an abraded surface so that light passing therethrough from either direction is diffused, creating translucent or even semi-opaque light transmission. Bands 120 appear frosted. As a result, the relatively opaque character of bands 120 contrasts with the transparency of raised surfaces 140, thereby simulating muntins in the glass panel 100 to the viewer. Further contrast is provided by grooves 130. Preferably, grooves 130 are formed according to the method disclosed in applicant's U.S. Pat. No. 5,409,416 to Eichhorn et al., in which case the difference between grooves 130 and roughed bands 120 is striking. Such grooves cause a refraction of light rays which results in a distortion of objects on one side of the class when viewed from the other. The nature and character of roughed bands 120 and grooves 130 will be better appreciated from the description below of the means and methods for forming glass sheets according to the present invention.

The sheet of glass 100 is conventionally commercially available annealed glass which normally comes in thicknesses in the range of ⅛ inch and 1 inch. The glass may either be transparent, frosted, translucent, opaque, or reflective, though transparent is preferred. Depending on the application, glass sheet 100 may be tempered after decorative bands 110 have been formed therein.

Figure 4:
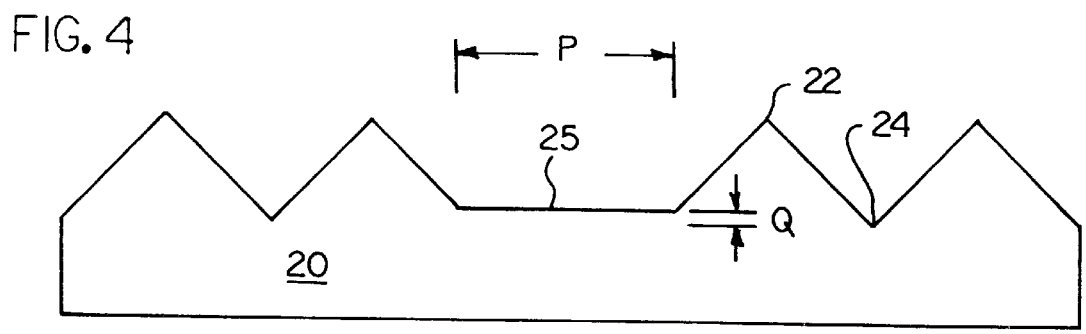
FIG. 4 is a fragmentary, sectional view of a diamond cutting wheel for executing a first pass.
Figure 5:
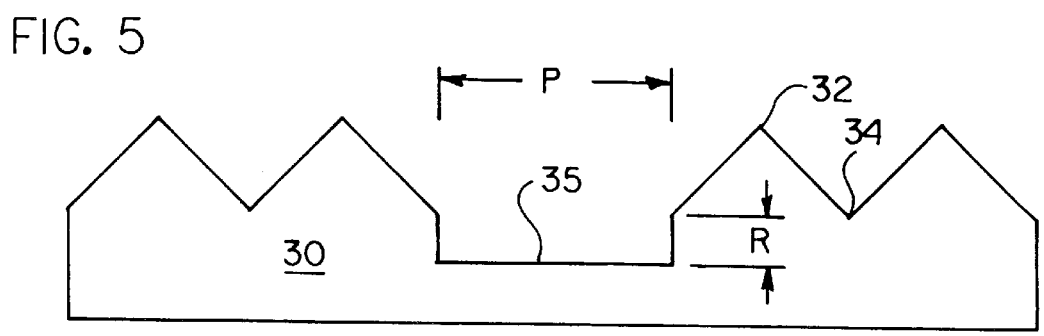
FIG. 5 is a fragmentary, sectional view of a polishing wheel for executing second and subsequent passes.

As will be explained hereinafter, the grooves 130 of decorative band 110 are formed by subjecting the glass sheet to a rough cut diamond grinding wheel 20 (FIG. 4), then to a finishing cut diamond grinding wheel, then to one or more polishing wheels 30 (FIG. 5). Rough cut wheel 20 is placed upstream of the polishing wheels 30 in a continuous operation, however, all grooves are rough cut simultaneously, then finish cut and polished simultaneously.

By contrast to the formation of grooves 130, roughed bands 120 are formed by subjecting the glass sheet to the rough cut diamond grinding wheel 20, and optionally the finishing cut diamond grinding wheel, however, no portion of the one or more polishing wheels 30 contacts the roughed band 120. Rather, roughed band 120 is formed by the rough cut diamond grinding wheel 20 and optionally the finishing cut wheel only.

Turning now to FIG. 4, there is illustrated schematically the surface of a rough grinding wheel 20, which is the mirror image of the groove and band pattern formed in the glass. Wheel 20 should be of a diamond particle composition held together by a suitable bonding material. As is shown in FIG. 4, the decorative bands 110 are formed by the surface of rough grinding wheel 20. The peaks 22 of rough grinding wheel 20 will correspond to the bottom of each groove 130 and the valleys 24 of grinding wheel 30 will correspond to the peaks of the grooves 130 in the glass sheet. Flat surface 25 will correspond to roughed band 120 of glass sheet 100. Dimension Q represents the distance by which flat surface 25 extends above peaks 24 of grooves 130, and, in particular, the distance by which the surface of glass panel 100 is reduced by the abrasion of flat surface 25 at roughed bands 120. P represents the width of flats 25 and 35, corresponding to the widths of bands 120.

Rough cut grinding wheel 20 is what is conventionally known as a "grinding wheel". That is, wheel 20 is of the type including particles or bits of diamond, marble, or like substance which serve to abrade or scar the surface of glass when forced into contact therewith.

Turning now to FIG. 5, there is illustrated schematically the surface of a polishing wheel 30, which is the mirror image of the groove pattern formed in the glass as well. In contrast to rough cut grinding wheel 20, polishing wheel 30 is what is conventionally known as a "polishing wheel". That is, wheel 30 is of the type formed from a material which serves to smooth and restore visual clarity to glass. Similarly, peaks 32 and valleys 34 of polishing wheel 30 will correspond to the valleys and peaks, respectively, of grooves 130. Flat surface 35 corresponds to the location of band 120. Notably, flat surface 35 is recessed so that when polishing wheel 30 is applied to the glass sheet to polish the grooves 130, surface 35 does not contact the glass sheet. Dimension R represents the distance by which flat surface 35 is recessed from the peaks of grooves 130, thereby providing clearance from roughed bands 120. In practice, polishing wheel 30 should have dimensions closer to the dimensions of grooves 130, rough cut wheel 20 being substantially similar with respect to the groove forming surfaces, except that the peaks and valleys will not be quite so deep. Further, the similarity between the profile of rough cut wheel 20 and polishing wheel 30 will depend on whether one or more finishing cut wheels as described below are employed. The actual dimensions and angular relationships between the grooves is preferably as described in applicant's U.S. Pat. No. 5,409,416 to Eichhorn et al., the disclosure of which is intended to be incorporated herein by reference.

The profile of the finishing cut grinding wheel or wheels may be the same as or similar to either the profile of the rough grinding wheel 20 or the polishing wheels 30, depending on whether it is desired to abrade the roughed band 120 with the finishing wheel. This will depend on the visual effect desired. The finishing cut grinding wheel or wheels are also what are conventionally known as "grinding wheels" as discussed above with regard to rough cut wheel 20.

With reference to FIGS. 4 and 5, the peak-to-peak distance of the grooves is preferably in the range of about 2 to 7 mm, with 3 mm most preferred. The depth of the grooves is preferably in the range of about 0.3 to 0.8 mm and most preferably 0.7 mm. Dimension Q is preferably in the range of about 0.2 to 0.5 mm with 0.25 mm most preferred. The R dimension is preferably from about 3 to 6 mm, most preferably 5 mm. Dimension P is preferably from about 4 to 10 mm. More preferably, dimension P is about 8 mm. It has been found that bands having a width P less than about 4 mm have a reduced visual effect as compared with bands in the described range.

Figure 6:
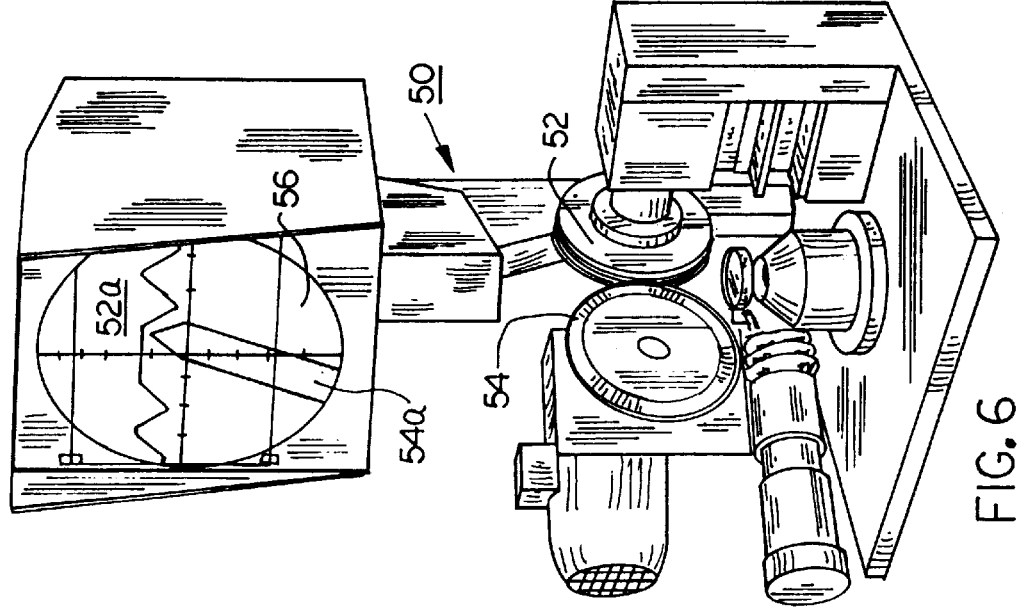
FIG. 6 is a perspective view of an apparatus used to form the grinding wheels.

Turning now to FIG. 6, there is illustrated an appropriate grinding wheel dressing apparatus. As can be seen in FIG. 6, the apparatus 50 includes a spindle for holding the workpiece 52 and a second precisely driven mounting apparatus for holding the dressing tool 54. The dressing tool 54 is moved back and forth and in and out with respect thereto to properly form and dress the wheel. To form the grooves, a first tool 54 is used to rough cut the general shape of the grooves. Then a second tool with a denser diamond cutting wheel having an $_{13}$ wall thickness and a 60° included angle is used to form the final profile of the grooves on the grinding wheels. The apparatus 50 also includes a magnifying viewer 56 that illustrates and displays an enlarged picture of the grinding wheel and trimming tool. The enlargement is approximately 10 times. By using a template of the same scale as the viewing device, the grinding wheel may be moved back and forth and in and out appropriately to achieve the desired surface configuration.

Figure 7:
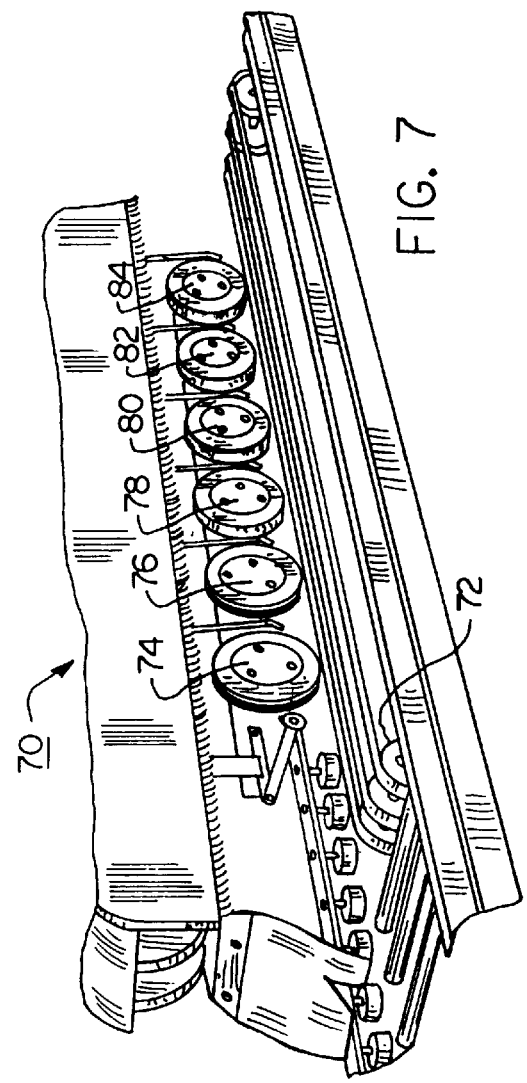
FIG. 7 is a perspective view of a portion of one type of a grinding machine set up to form the decorative bands of the present invention.

In FIG. 7, there is illustrated one type of grinding apparatus on which the glass sheet is positioned and moved. This is a relatively conventional apparatus 70 which includes a conveying apparatus 72 upon which the workpiece is placed. The conveyor moves the workpiece longitudinally past one or more grinding wheels 74, 76. The workpiece is held onto the conveyor by clamps or vacuum. As the workpiece is moved past the first grinding wheel 74 corresponding to rough cut grinding wheel 20, the rough cut of the grooves 130 and the roughing of the band 120 is formed. The workpiece then progresses past the second finishing wheel 76 where the finishing cut is formed in the grooves and, optionally, the band 120. Finally the grooves are polished by subjecting them to one or more polishing wheels 78, 80, 82, 84 corresponding to polishing wheel 30. Roughed bands 120 are not altered in this step. Notably, the roughed band and all of the grooves are rough cut simultaneously. All of the grooves are finish cut (with or without the roughed band, as discussed above) simultaneously. Further, the grooves are all polished simultaneously. This permits the grooves 130 and roughed bands 120 to be maintained parallel and adjacently spaced.

Alternatively, the workpiece can be held on a work table and subjected to a plurality of grinding and polishing wheels mounted on a movable, precisely controlled head. This might be more appropriate for a pattern in which the grooves 130 and roughed bands 120 are curved or not in a straight line. Suitable apparatus and methods for forming the decorative bands in this manner will be readily appreciated by those of ordinary skill in the art upon reading the foregoing.

The decorative glass panels according to the present invention may be varied as desired. For example, there may be more than two parallel grooves on either side of each roughed band 120. Alternatively, there may be only a single groove on either side of the roughed band. The roughed band may be provided with one or more grooves only on one side of the roughed band. The decorative glass sheet may be formed with one or more decorative bands which do not intersect.

Figure 8:
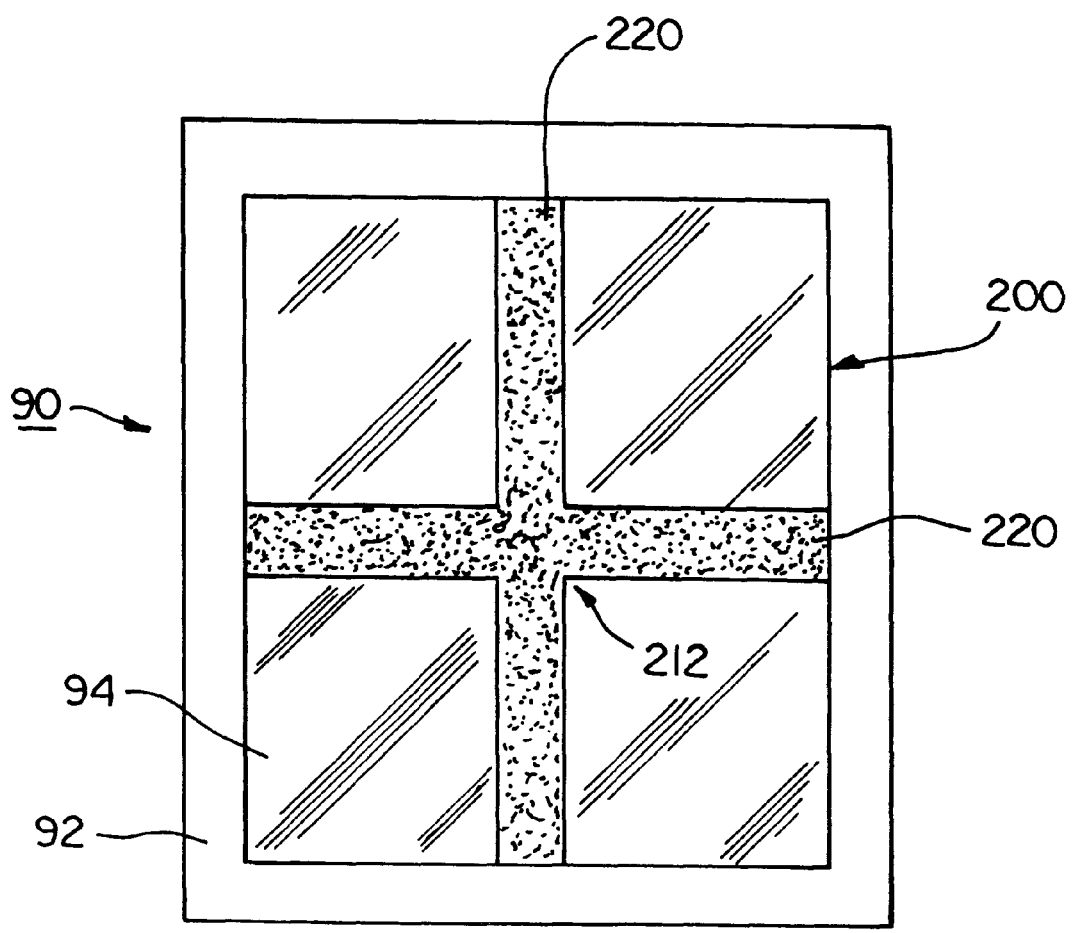
FIG. 8 is a front elevational view of an insulated glass unit incorporating a decorative glass sheet according to a second embodiment of the present invention.

Further, the roughed bands may be formed as described without any adjacent grooves, thereby simulating muntins without the refractive framework of the grooves as described. For example, an insulated glass unit 90 as shown in FIG. 8 includes a transparent glass sheet 94 and a frame 92 corresponding to elements 14 and 12, respectively, of insulated glass unit 10. Decorative glass sheet 200 has roughed bands 220 formed on the interior surface thereof and together forming intersection 212. Roughed bands 220 correspond to and may be formed in the same manner as roughed bands 120.

While decorative glass sheets 100, 200 has been described in relation to an insulated glass unit, it will be appreciated that it may be used for other architectural glass applications. For example, the decorative glass sheets may be employed in patio doors, storm doors, shower doors, single panel windows, and like structures. Further, the decorative bands of the present invention may be formed in mirrored glass. Thus, a considerable and varied number of quite pleasing visual effects may be achieved for use in a wide range of applications.

Another approach to a band and groove pattern is illustrated in FIGS. 9–14. This embodiment involves replacing the roughed ban glass 100 of FIG. 2 with a glass panel like that shown at 150 in FIG. 9 or at 300 in FIG. 10. Here at least one colored band is applied to one of the two opposed surfaces of a glass sheet to simulate the appearance of a muntin.

Figure 9:
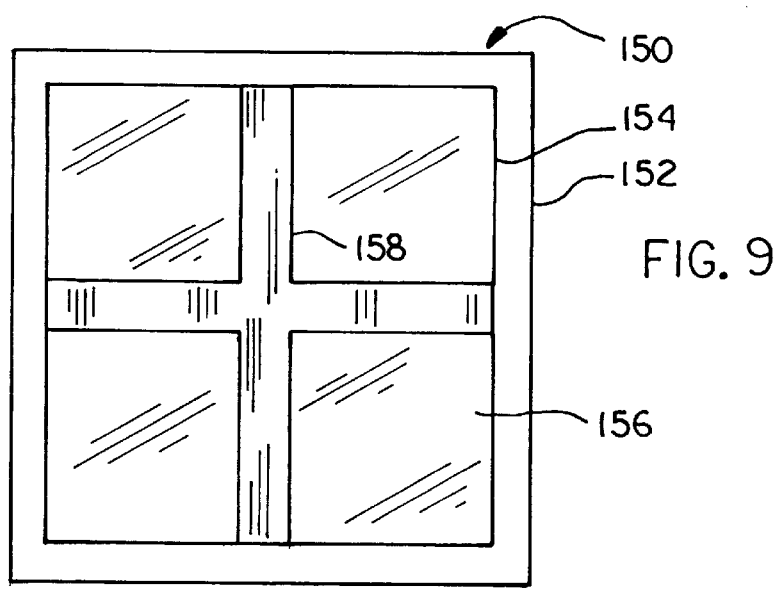
FIG. 9 illustrates an elevational view of a window unit incorporating the colored bands of the present invention.
Figure 10:
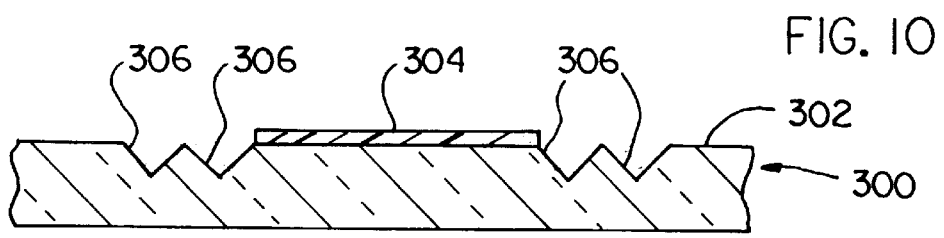
FIG. 10 a partial crossectional view taken along 10—10 of FIG. 13 showing the colored band of the present invention positioned adjacent a plurality of parallel grooves.

FIG. 9 depicts a window unit incorporating one embodiment of this approach. Window unit 150 includes a frame 152 which holds glass sheet 154. The glass sheet comprises a glass panel having opposed surfaces with at least one colored band 158 formed on at least one of the surfaces. A remaining portion 156 of the surface not covered by the colored band 158 contrasts with the colored band so as to simulate the appearance of at least one muntin dividing the glass panel into at least two individual panes. As shown in FIG. 9, this embodiment may comprise first and second intersecting colored bands formed on the surface of the glass. The embodiment shown in FIG. 9 simulates the appearance of a multi-pane window having four individual panes. The colored bands used for this alternative embodiment may have a width of between about 4 and about 25 mm.

The simulated muntin appearance may be enhanced by the addition of at least one straight walled groove positioned parallel to and immediately adjacent the colored band. This enhancement is shown in detail in FIG. 10, a partial sectional view taken along 10—10 FIG. 12. Glass panel 300 has colored band 304 applied to a surface 302 thereof. Straight walled grooves 306 are formed parallel to and immediately adjacent colored band 304. Two grooves 306 are shown positioned on opposite sides of the colored band 304. However, this enhancement of simulated muntin affect may be created by using only groove on one side of colored band 304 or more than three grooves 306 on opposed sides of colored band 304. The selection of the number of grooves will vary depending on the desired effect.

Figure 11:
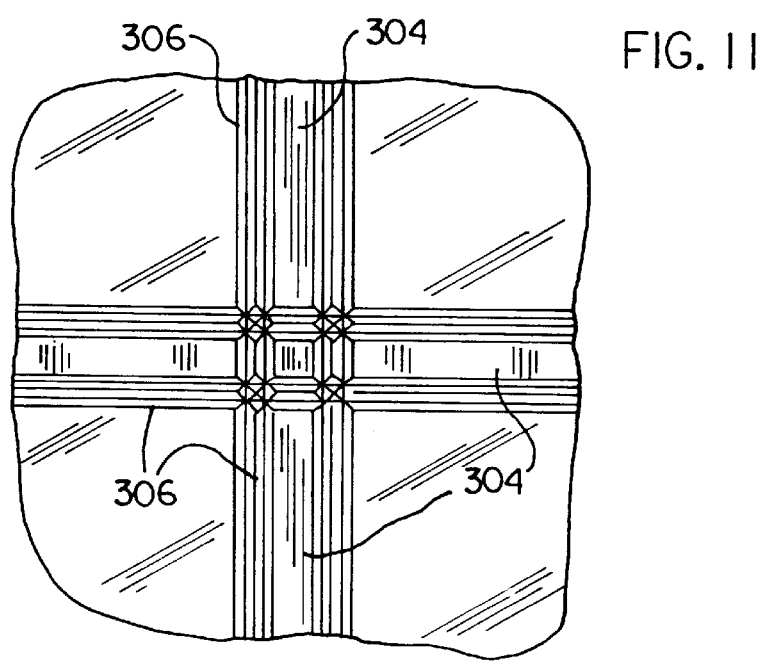
FIG. 11 is a partial cutaway view of the intersection of two colored bands and associated grooves in the surface of a continuous glass sheet.

FIG. 11 illustrates the effect created at the intersection of two colored bands 304 and associated grooves 306. Preferably, colored bands 158, 304 have a width of between about four and ten millimeters.

The colored band is formed using any one of the numerous, well-known techniques for applying color to a glass sheet. These techniques include screen printing, the use of an epoxy ink that is air or heat cured and an ultra violet ink that is cured by an ultra violet light. An alternative method for applying the color to the glass sheet is the use of a ceramic frit. A frit is a vitreous substance used in making porcelain, glazes, or enamels. The frit is a powder-like substance that is fired into the glass surface during a heating process. Yet another alternative for the colored band would be to cure a fired ink with a lehr. This approach is advantageous because it neither heats strengthens nor tempers the glass.

The manufacturing steps for this embodiment include providing a continuos transparent glass sheet referred to in the field as a sheet of clear glass. Next the sheet is given an edge preparation treatment well known in the art. In the next step, at least one colored band is formed on at least one of the surfaces of the glass sheet. This colored band may be formed using any one of the printing techniques described above. The glass panel is then subjected to a heat treatment. The purpose of the heat treatment is to dry the material used to create the colored band. If a ceramic or some other type of frit is used, then the heat treatment or UV light treatment would be appropriate to set the frit. Next, the grooves are applied using the process described hereinabove. The glass may next be subjected to a tempering process depending on the final use of the product. After this step the embodiment is complete and comprises a glass sheet that simulates the appearance of at least one muntin dividing the glass sheet into at least two individual panes.

Figure 13:
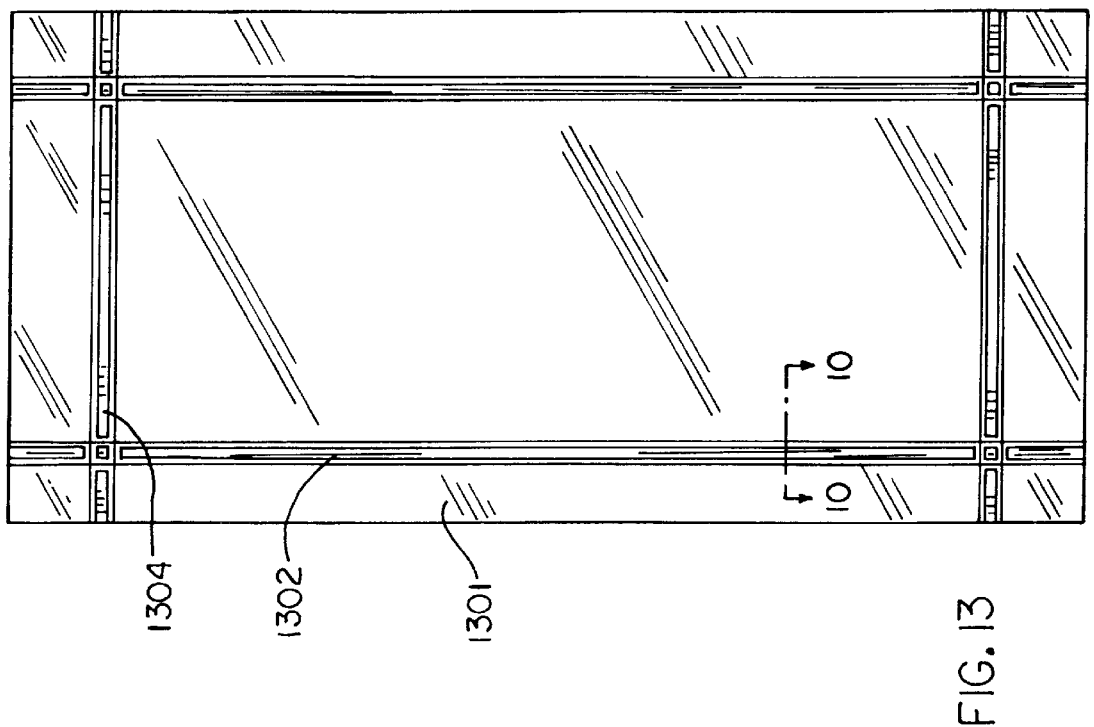
FIG. 13 depicts the use of the present invention to create a continuous glass sheet having the appearance of a "priarie" door.
Figure 12:
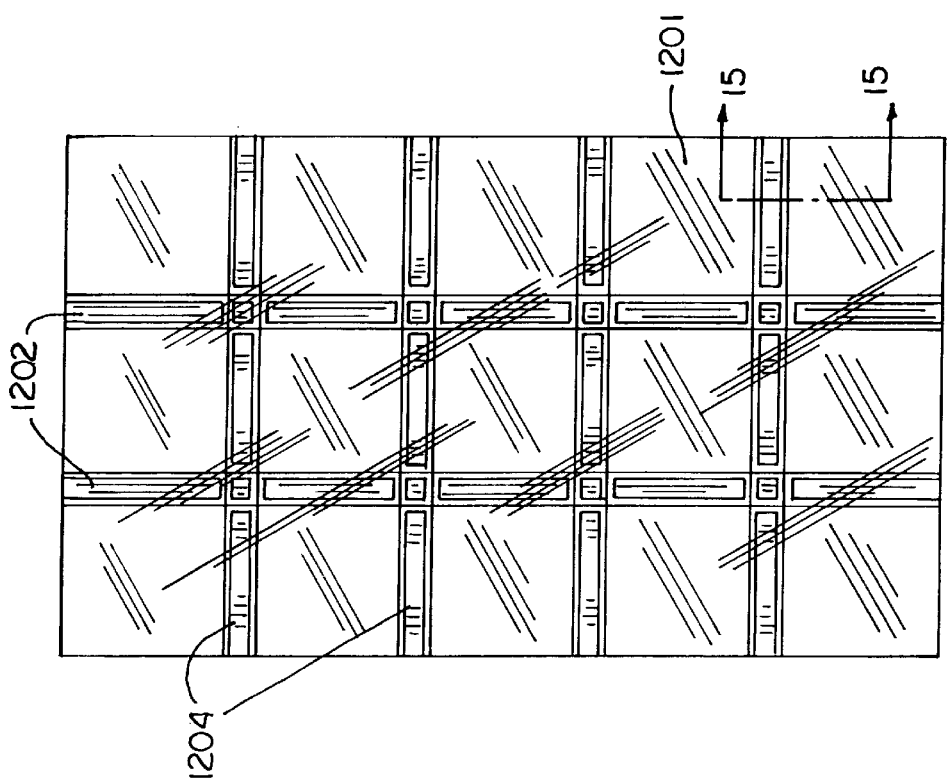
FIG. 12 depicts the use of the present invention to create a continuous glass sheet having the appearance of a 15 light window or window insert for a door.
Figure 14:
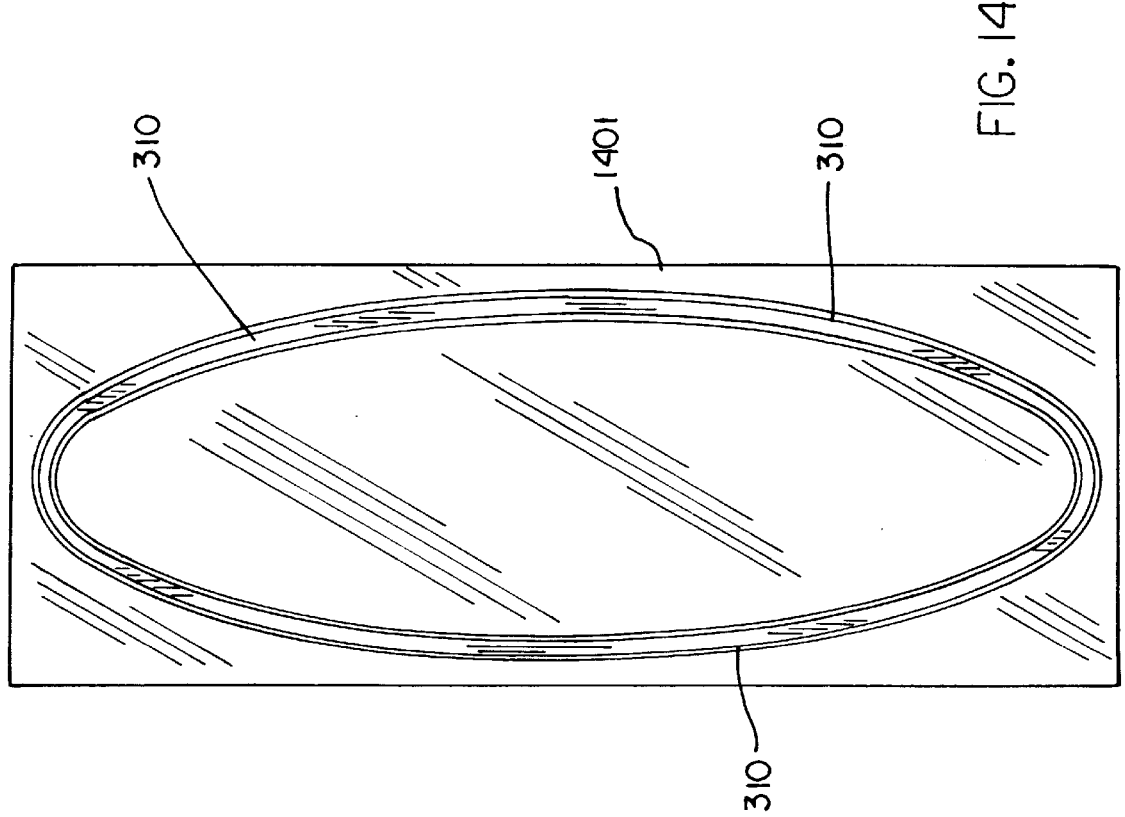
FIG. 14 illustrates the use of the colored band embodiment of the present invention to create the appearance of a plurality of curved muntins in a continuous glass sheet.

The number and location of the colored bands may be changed to suit the type of effect desired as illustrated in FIGS. 12, 13, and 14. FIG. 12 illustrates a simulated 15-lite window 1201. This appearance is created by vertical colored bands 1202 and horizontal colored bands 1204 that intersect in the same manner as traditional wood muntins. FIG. 13 illustrates a glass sheet 1301 having a muntin pattern referred to as a "prairie" door in the art. Again, the muntin appearance is created by vertical 1302 and horizontal 1304 colored bands. Each of these glass sheets contains at least one colored band formed on at least one of the sheet's two opposed surfaces. The simulated muntin appearance of the embodiments depicted in FIGS. 12 and 13 may be enhanced by the addition of the grooves described above. FIG. 14 illustrates a particularly effective embodiment of the present invention. The glass sheet 1401 include curved sections 310 that are easily created according to the practice of the present invention. Fabricating true individual panes joined by such curved muntins would be prohibitively expensive. The resulting structure would not be suitable for use in an IGU. It would also be prohibitively expensive to create false muntins from metal or wood to create a curved-muntin appearance.

Figure 15:
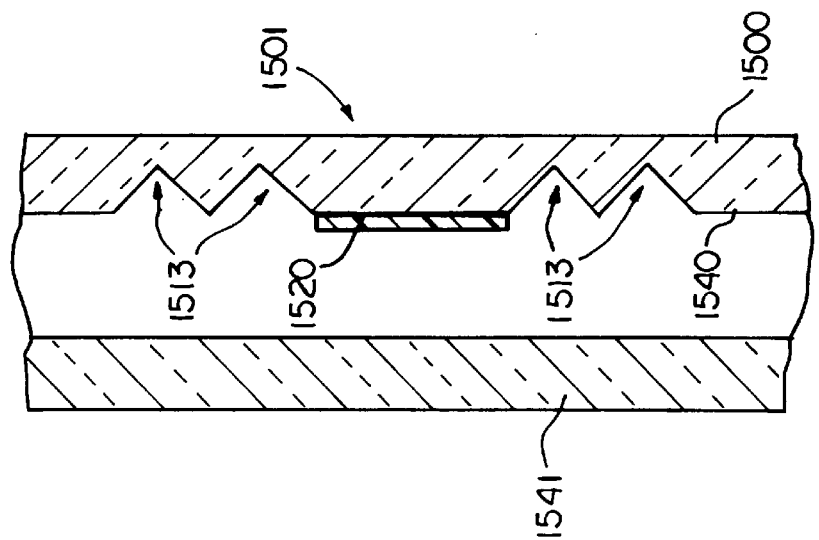
FIG. 15 is a partial sectional view of a further embodiment in which the invention is incorporated into an insulted glass unit.

It will be appreciated that, the colored band embodiment of the present invention may be used in an insulated glass unit (IGU) as shown in FIG. 15. The IGU is made up of continuous glass panels 1514, 1500 that form an insulating air space 1516 therebetween. Colored band 1520 is applied to the inside surface 1540 of glass panel 1500 facing the air space 1516. This embodiment may also include grooves 1513 as discussed above.

It will be appreciated that because colored band 1520 is formed on a surface of the glass panel of an insulated glass unit facing the gap between the panels as described, the life of the colored bands will be extended. This is because the coated surface 1520 will not be subjected to the abrasive action resulting from repeated washings on the window/door. For those applications where it is necessary or desirable to expose the colored band 1520 to weather, a ceramic frit is used because it offers the advantage of holding up well under such conditions.

Another advantage of this embodiment is that the color of colored band 158,304 may be selected to match the color of a surrounding window or door frame. Although typically a few standard colors are used in the art, there exists the potential to create and use a wide range of desired colors.

There has been described and illustrated hereinabove a detailed description of a preferred embodiment. Obviously, various changes and modifications might be made to the embodiment described without departing from the scope of the invention which is set forth in the claims which follow.

What is claimed is:

1. A continuous transparent glass sheet, comprising:
   a) a glass panel having opposed surfaces;
   b) at least one colored band formed on at least one of the surfaces;
   c) at least one straight walled groove positioned parallel to and immediately adjacent the colored band; and
   d) a remaining portion of the at least one surface not covered by the colored band, such that the colored band contrasts with the remaining portion of the surface to simulate the appearance of at least one muntin dividing the glass panel into at least two individual panes.

2. The decorative glass sheet of claim 1 wherein the glass sheet further includes at least one of said at least one straight walled groove disposed on opposed sides of the colored band, each of the straight walled grooves being parallel to the colored band.

3. The glass sheet of claim 1 further comprising a plurality of said parallel, straight walled grooves positioned parallel to and immediately adjacent the colored band.

4. The glass sheet of claim 1 further comprising a plurality of said parallel, immediately adjacent straight walled grooves positioned on opposed sides of the colored band, the straight walled grooves positioned parallel to the colored band and two of the straight walled grooves disposed immediately adjacent the colored band.

5. The decorative glass sheet of claim 1 further comprising a second colored band formed on the surface and intersecting the first colored band.

6. The decorative glass sheet of claim 1 wherein the colored band is between about 4 and about 25 mm wide.

7. A simulated multi-pane window glass sheet, comprising:
   a) a continuous glass panel having opposed surfaces;
   b) a least one colored band formed on at least one of the surfaces the colored band having the appearance of a multi-pane window muntin;
   c) at least one straight walled groove positioned parallel to and immediately adjacent the colored band; and
   d) a remaining portion of the surface not covered by the colored band, such that the colored band contrasts with the remaining portion of the surface to simulate the appearance of multi-pane window having at least two individual panes.

8. The decorative glass sheet of claim 7 wherein the colored band is between about 4 and about 25 mm wide.

9. A continuous transparent glass sheet having the appearance of a multi-pane structure comprising:
   a) a glass panel having opposed surfaces;
   b) first and second colored bands formed on at least one of the surfaces and intersecting one another,
   c) a plurality of parallel, immediately adjacent straight walled grooves disposed on opposed sides of the colored band, the straight walled grooves disposed parallel to the colored band and two of the straight walled grooves disposed immediately adjacent the colored band; and
   d) a remaining portion of the surface not covered by the colored bands, such that the colored bands contrasts with the remaining portion of the surface to simulate the appearance of a plurality of muntins in the glass panel dividing the glass panel into a plurality of individual panes.

10. The decorative glass sheet of claim 9 wherein the colored band is between about 4 and about 25 mm wide.

11. An insulated glass unit comprising:
    a) a frame;
    b) a pair of opposed glass panels mounted in the frame and defining a gap therebetween;
    c) at least one straight walled groove positioned parallel to and immediately adjacent the colored band; and
    d) at least one of the glass panels comprising a continuous transparent sheet having opposed surfaces and including:
       i) at least one colored band formed on at least one of the surfaces; and
       ii) a remaining portion of the surface not covered by the decorative band, whereby the decorative band contrasts with the remaining portion of the surface to provide a unique visual effect including the simulation of a muntin on the glass panel.

12. The insulated glass unit of claim 11 further comprising at least one of said straight walled grooves is disposed on opposed sides of the colored band, each of the straight walled grooves disposed parallel to the colored and two of the straight walled grooves disposed immediately adjacent the colored band.

13. The insulated glass unit of claim 11 further compromising a plurality of parallel, immediately adjacent ones of said straight walled grooves disposed parallel to the colored band, at least one of the straight walled grooves disposed immediately adjacent the colored band.

14. The insulated glass unit of claim 11 further comprising a plurality of parallel, immediately adjacent ones of said straight walled grooves disposed on opposed sides of the colored band, the straight walled grooves disposed parallel to the colored band and two of the straight walled grooves disposed parallel to the colored and and two of the straight walled grooves disposed immediately adjacent the colored band.

15. The insulated glass unit of claim 11 further comprising a second decorative band formed on the surface and intersecting the first decorative band.

16. The insulated glass unit of claim 11 wherein the colored band is between about 4 and about 25 mm wide.

17. The insulated glass unit of claim 11 wherein the colored band is formed on a surface of a side of the at least one glass panel facing the gap between the pair of panels.

* * * * *